United States Patent [19]

Schaeffer

[11] Patent Number: 4,546,570

[45] Date of Patent: Oct. 15, 1985

[54] APPARATUS FOR APPLYING AGRICULTURAL CHEMICALS INCLUDING CONTACT TYPE HERBICIDES

[76] Inventor: Norman E. Schaeffer, R.R. #1, Forest City, Mo. 64451

[21] Appl. No.: 447,208

[22] Filed: Dec. 6, 1982

[51] Int. Cl.[4] ............................................. A01G 13/00
[52] U.S. Cl. ...................................................... 47/1.5
[58] Field of Search ................................... 47/1.5, 1.7; 239/120–121, 42–46; 119/157; 15/244 A–244 B

[56] References Cited

U.S. PATENT DOCUMENTS

| | | | |
|---|---|---|---|
| 2,274,303 | 2/1942 | Ornstein | 46/22 X |
| 3,143,839 | 8/1964 | Johnson | 47/1.5 X |
| 4,019,278 | 4/1977 | McKirdy | 47/1.5 |
| 4,332,107 | 6/1982 | Reed | 47/1.5 |
| 4,377,920 | 3/1983 | Bowman | 47/1.5 |
| 4,426,807 | 1/1984 | Maddock | 47/1.5 |
| 4,459,777 | 7/1984 | Moore et al. | 47/1.5 |

Primary Examiner—James R. Feyrer
Assistant Examiner—Danton D. DeMille
Attorney, Agent, or Firm—Schmidt, Johnson, Hovey & Williams

[57] ABSTRACT

Improved apparatus is provided for use in applying agricultural chemicals. The apparatus is primarily configured to improve the application of minimal-contact-kill type herbicides to field weeds or the like extending above the tops of a field crop, but also includes provision for the simultaneous application to the field of other agricultural chemicals adapted to be sprayed, such as insecticides, fertilizers or other herbicides. The apparatus is adapted to be mounted on the front of a tractor and includes shiftable frame and support structures for adjusting the height and inclination of the direct engagement or contact type applicator to crop and weed conditions and to terrain conditions, as well as permitting disposition of the normally laterally extending parts of the apparatus in positions to facilitate movement of the apparatus along roads, through gates or the like between uses thereof. The contact applicator avoids drippage of the contact-kill type herbicide upon crops in the field in which weeds or the like are being treated by employing controlled recirculation of the herbicide material at relatively low pressure through a conduit having spaced orifices covered by a porous sleeve having an inner liquid holding portion and an outer foraminous portion.

1 Claim, 9 Drawing Figures

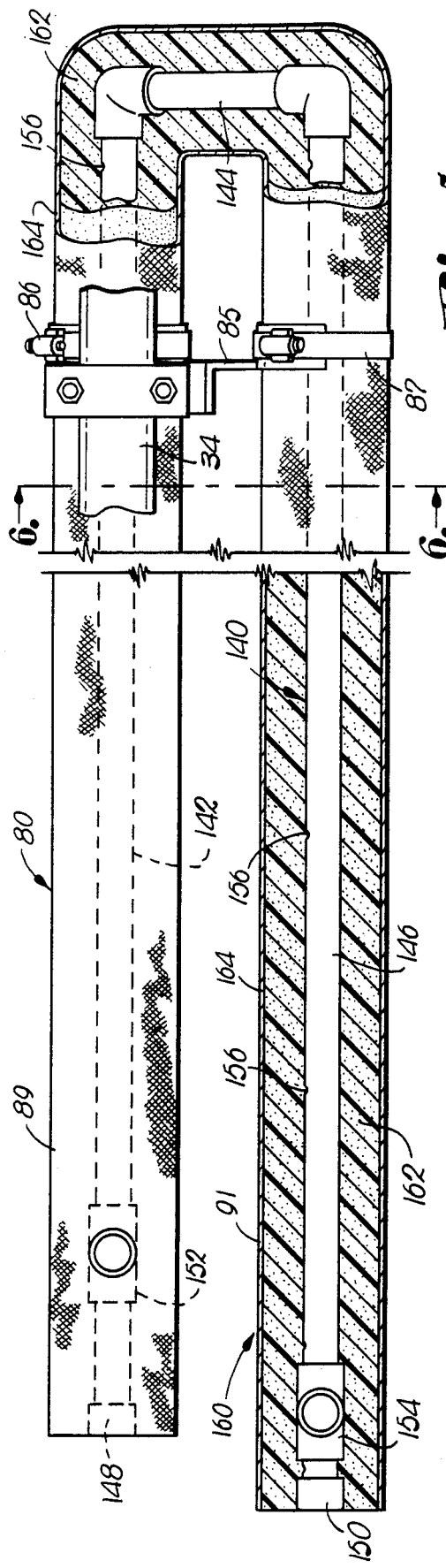
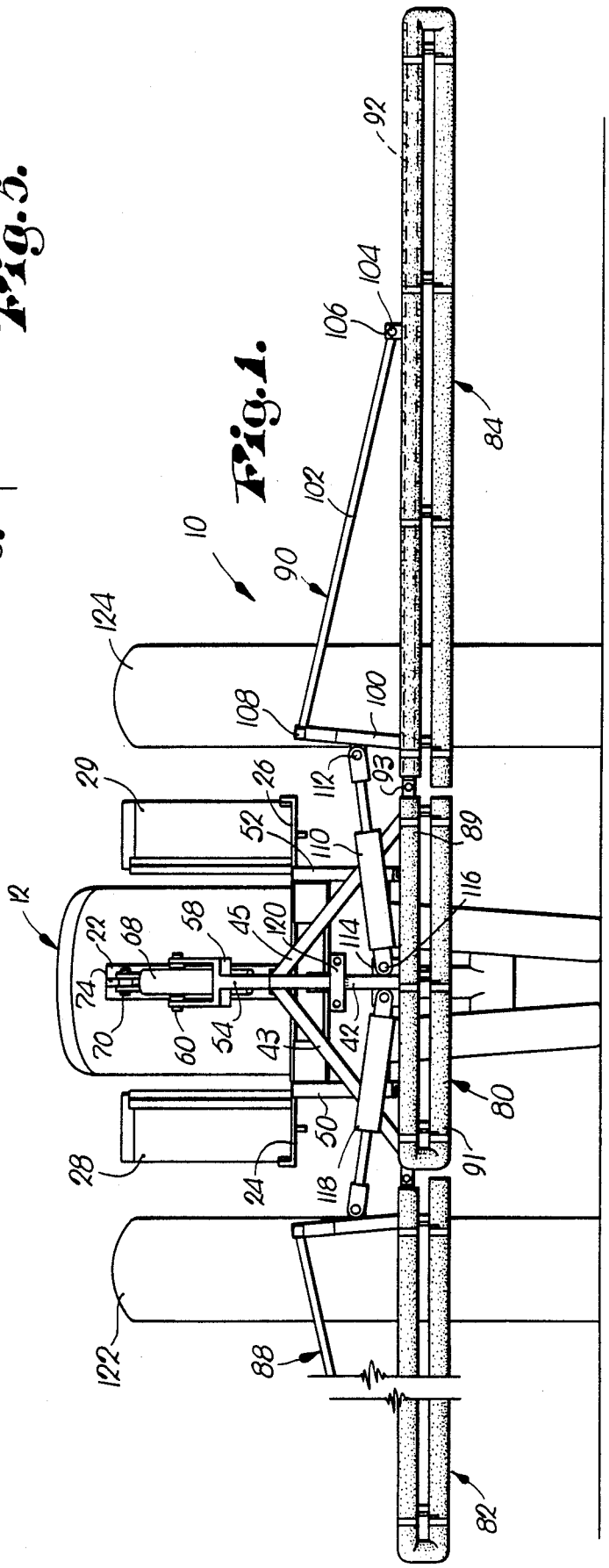

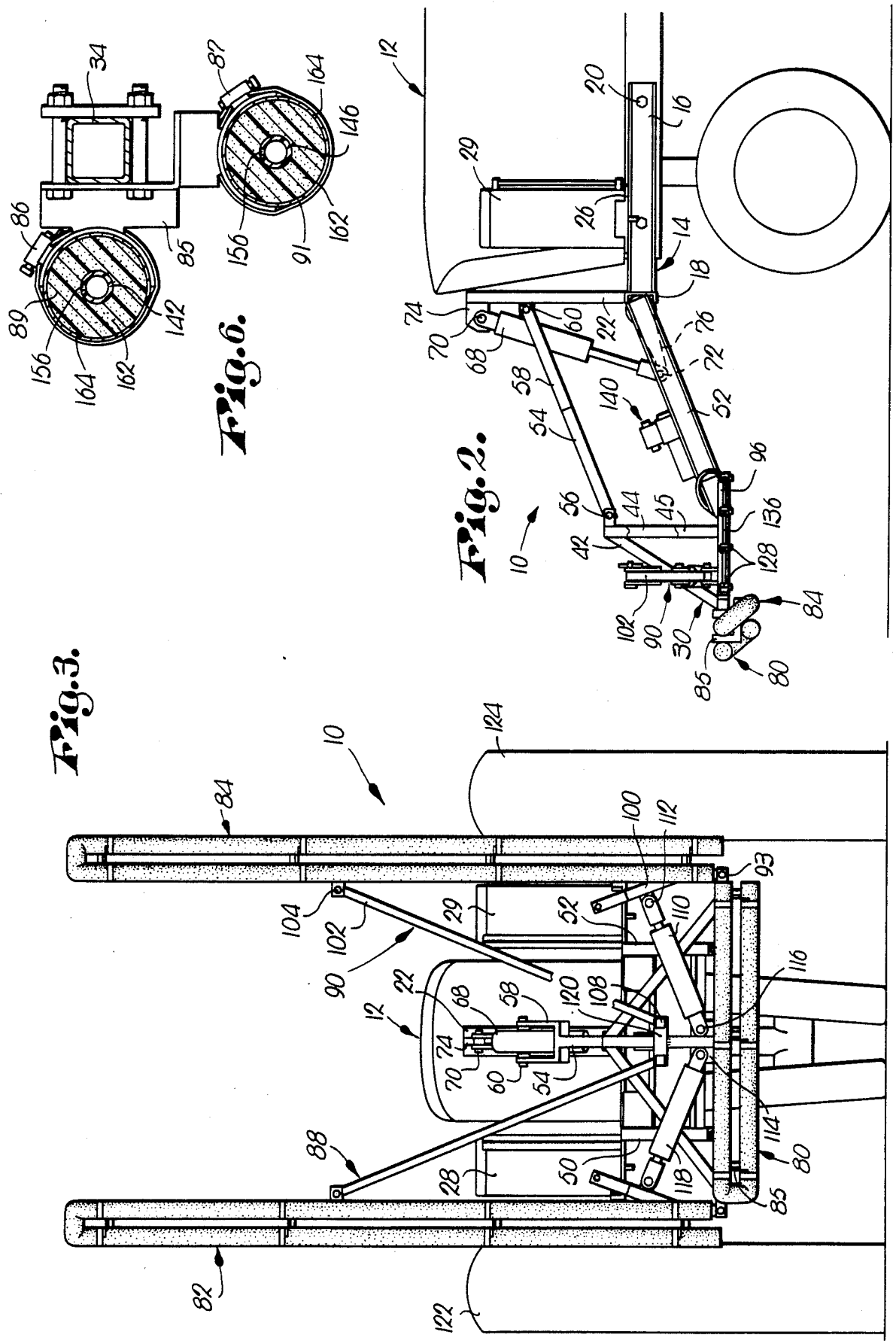

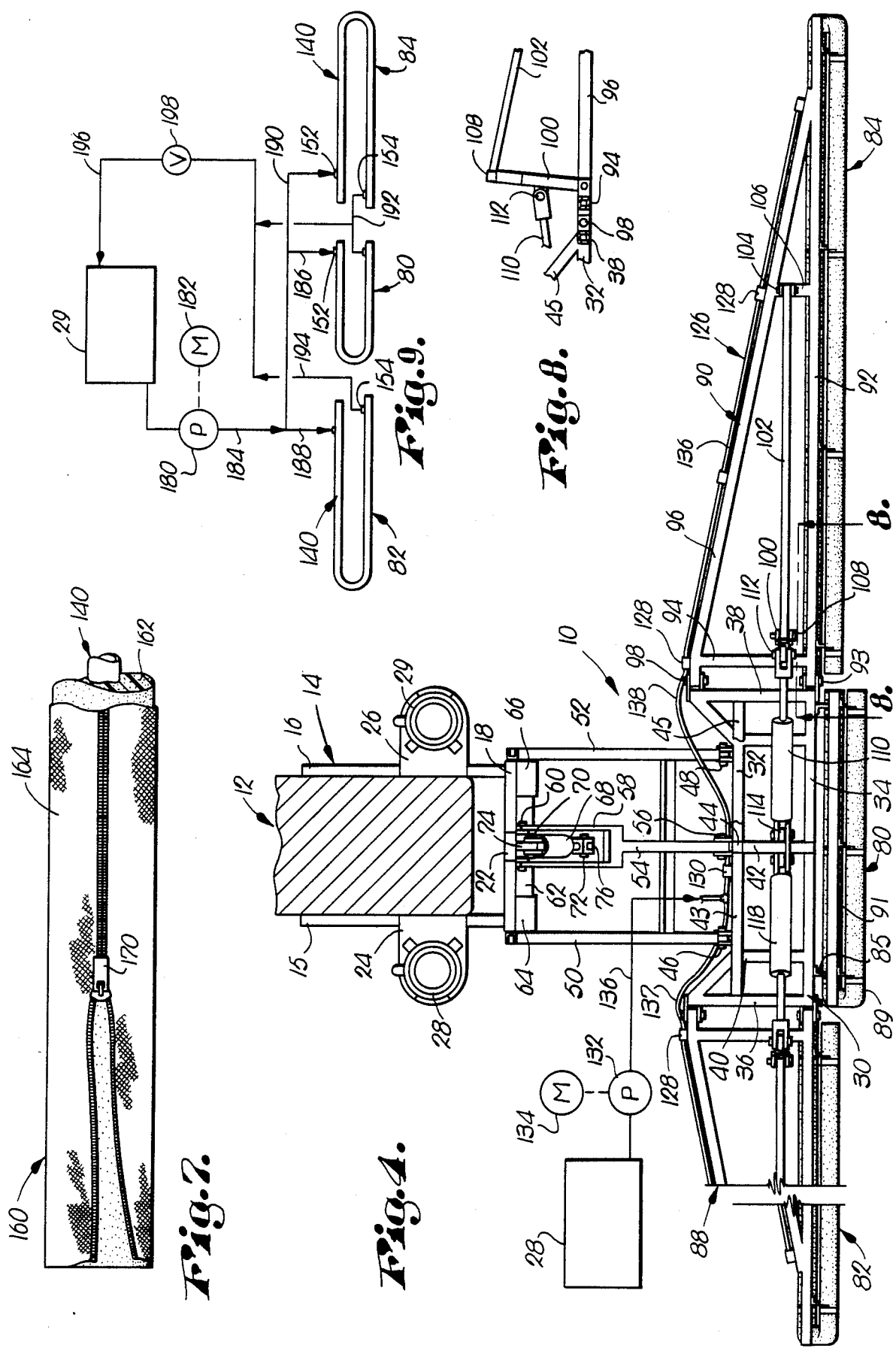

APPARATUS FOR APPLYING AGRICULTURAL CHEMICALS INCLUDING CONTACT TYPE HERBICIDES

BACKGROUND OF THE INVENTION

1. Field of the Invention

This invention relates to apparatus for applying agricultural chemicals including particularly minimal-contact-kill type herbicides, either alone or in conjunction with the simultaneous application of another agricultural chemical such as a sprayable insecticide, fertilizer or other herbicide.

A primary object and accomplishment of the invention is to provide apparatus for applying minimal-contact-kill type herbicides to the portions of weeds, field grasses, volunteer growth or other undesired plants extending above the tops of a field crop without such herbicides contacting and killing portions of the field crop with which the undesired plants to be killed are interspersed. A second, very significant object and accomplishment of the invention is to provide apparatus not only satisfying the noted primary object, but also incorporating practical means in compatible combination with the contact applicator means for applying a spray type agricultural chemical during a single pass through a field, when desired. Other important objects and advantages of the invention will be pointed out in or become apparent from the disclosure and claims which follow.

Agricultural chemicals can be categorized in various ways, such as with respect to their purpose (e.g., herbicides, fertilizers, insecticides, etc.), their generality in significantly affecting a large variety of types of plants or specificity in primarily affecting only a single or small number of types of plants, their physical nature when applied (e.g., liquid, powdered, etc.), their mode of operative introduction to plants being treated (e.g., by absorption through foliage, by absorption through roots, etc.), their characteristics concerning the amount required for effective action, and their mode of optimal field application (e.g., direct engagement of foliage of plants by wetted carrier, liquid spraying upon foliage of plants and/or adjacent soil, spreading of powder upon foliage of plants and/or adjacent soil, tilling into soil, etc.). The apparatus of this invention permits the effective application of relatively small quantities of agricultural chemicals (especially herbicides of the minimal-contact-kill type), in liquid form and of nature to affect virtually any plants contacted thereby, by moving a carrier wetted with such chemical into direct contact with an upper portion of the foliage of plants to be killed or otherwise treated by the contact-acting chemical, and also permits the simultaneous application to adjacent plants and/or soil of any other desired type of agricultural chemical in liquid form, by liquid spraying, in order that two agricultural chemicals for different purposes may be applied during a single pass over a given field area.

2. Description of the Prior Art

With respect to the primary capability of the apparatus of this invention for applying a minimal-contact-kill type herbicide or the like, the closest known prior art are so-called "ropewick applicators", which are generally described in "Is Your Ropewick Really Wicking?", by Dale Bruce of the Extension Information department of Iowa State University, published in the July 10, 1982 issue of *Wallaces Farmer*, and of which a typical example is the ropewick applicator offered by Monsanto Company for use in applying its widely advertised minimal-contact-kill type liquid form herbicide sold under the trademark "Roundup". Such ropewick applicators essentially involve an elongate, hollow container adapted to be mounted on a tractor in laterally extending relationship to the path of travel of the latter, which can be filled with a quantity of the liquid herbicide material and is provided with spaced pairs of holes along its undersurface, each pair of which holes receives an end portion of a generally U-shaped, depending loop of rope of nylon or other material capable of functioning as a wettable "wick"; the herbicide material flows by gravity into the interstices between the strands of each rope loop, and the container is set at a height such that, as the tractor traverses a field, the wetted loops will directly engage an upper portion of the foliage of field weeds, volunteer corn or the like to be killed at a level above the tops of any field crop also growing in the same field and will through that engagement deposit a small but sufficient amount of the herbicide upon the foliage of the weeds or the like to kill the same.

Such ropewick applicators and minimal-contact-kill type herbicides have proved quite effective in killing weeds or the like contacted thereby. However, such ropewick type applicators suffer from the serious disadvantage that the liquid herbicide material inherently tends to accumulate at and drip from the lower bight portion of the rope loops, with devastating effect upon a crop growing in the field being treated by virtue of the generality of the killing action of such herbicides upon virtually any plant life that may be contacted by even a miniscule quantity thereof. As pointed out in the mentioned publication, ropewick applicators have also been found subject to a number of other limitations and disadvantages, including the difficulty of achieving a proper rate of gravity flow of the herbicide material into the rope loops.

With respect to the secondary capability of the apparatus of this invention for efficiently permitting the simultaneous application of a second, liquid, agricultural chemical of virtually any type by spraying, the general technique of applying such a material by spraying, either from an airplane or from a ground-based device for that specific purpose, is, of course, well known and common practice. However, insofar as I am aware, no prior apparatus has ever provided for the coordinated and simultaneous application of both a direct foliage engagement type agricultural chemical and a sprayed type agricultural chemical during a single pass through the field area and in manner in which the application parameters are appropriate for both materials and can be jointly accommodated to plant height, terrain conditions and the like.

SUMMARY OF THE INVENTION

This invention overcomes the disadvantages and limitations of prior devices for use in applying minimal-contact-kill type, liquid herbicides by providing improved apparatus for that purpose in which the inherent tendency of ropewick type applicators to kill underlying field crops through drippage is avoided, the over-all adaptability of the apparatus for use with various materials and under varying conditions is enhanced, and provision is also made for permitting the simultaneous application of a second, sprayable, agricultural chemical during a single pass through a field.

The improved apparatus includes frame and support structures for the applicators, which are adapted to be mounted on the front of a tractor, are shiftably positionable to accommodate the applicators to various crop and weed heights and various terrain conditions (as well as a traveling mode between uses in the field), and are arranged to suitably satisfy the requirements of both the direct engagement and spray types of applicators provided to permit simultaneous application of both a contact type herbicide and another agricultural chemical that is to be applied by spraying.

The direct engagement type applicator portion of the apparatus for applying a minimal-contact-kill herbicide employs recirculation of the liquid herbicide material at a controlled, relatively low pressure through a path including a reservoir, a pump, flow controlling means, connecting conduits and the tubular, inner, pipe-like portions of the sections of the applicator itself. Each section of the direct engagement type applicator is provided with spaced orifices along the upper surface of the inner pipe-like portion thereof, and the latter are in turn covered by a generally cylindrical, porous sleeve having an inner layer of wettable, liquid holding material and an outer jacket of foraminous, abrasion resistant material. The outer jacket of the sleeve may be provided with a zipper type fastener to facilitate removal for cleaning or replacement after the wear that naturally results from continuing engagement of weeds and the like therewith during use.

The sprayer type applicator portion of the apparatus is most conveniently and effectively implemented with spaced spray heads mounted along the same shiftable support structures as carry the sections of the direct engagement type applicator.

BRIEF DESCRIPTION OF THE DRAWINGS

In the accompanying drawings:

FIG. 1 is a front elevational view of my currently preferred embodiment of the apparatus of the invention illustrated as installed on the front of a tractor, with the various parts of the apparatus shown in a normal operating disposition;

FIG. 2 is a side elevation view of the apparatus, with its parts in a normal operating disposition;

FIG. 3 is a front elevational view of the apparatus, with its normally laterally outwardly extending parts folded upwardly into dispositions for between-use road travel or the like;

FIG. 4 is a top plan view of the apparatus, with its parts in a normal operating disposition, and includes a schematic depiction of the liquid feed system associated with the sprayer type applicator;

FIG. 5 is an enlarged rear view, partially in elevation and partially in cross-section, of one of the sections of the direct engagement type applicator portion of the apparatus;

FIG. 6 is a cross-sectional view taken on Line 6—6 of FIG. 5;

FIG. 7 is a fragmentary elevational view of a modified construction for a direct engagement type applicator section in which the outer jacket is provided with a zipper to facilitate removal for cleaning or replacement after wear;

FIG. 8 is a fragmentary front elevational view taken on Line 8—8 of FIG. 4, showing a portion of the frame and support structures at the interface between the central and a lateral portion thereof; and FIG. 9 is a schematic diagram depicting the liquid recirculation system for the direct engagement type applicator.

DESCRIPTION OF THE PREFERRED EMBODIMENT

My currently preferred embodiment of apparatus embodying the invention will next be described for purposes of illustration, although those skilled in the art will recognize that equivalent constructions can be satisfactorily employed with respect to a number of details.

The apparatus broadly designated 10 is preferably mounted upon the front of a tractor 12 of any suitable type, where the operator may conveniently observe the operation of the apparatus 10 and exert necessary control over the latter to accommodate to field conditions and the like. Accordingly, referring particularly to FIGS. 2 and 4, the apparatus 10 is provided with frame structure 14 including side members 15 and 16 interconnected by a frontal member 18 adapted to be secured to the tractor 12 by bolts or the like as at 20. The frontal member 18 is provided with an upstanding post 22, and the side members 15 and 16 are respectively provided with laterally extending brackets 24 and 26 for respectively carrying containers 28 and 29 for two agricultural chemicals to be applied by means of the apparatus 10.

The frame structure 14, in addition to the rearward stationarily mounted components previously identified, further includes a shiftable, forward sub-frame assembly 30 including a rear member 32, a forward member 34, side members 36 and 38, front-to-rear cross pieces as at 40, a front-to-rear extending, central assembly including an upwardly and rearwardly inclined brace 42 and a rearward post 44. Outwardly and downwardly extending bracing elements for the post 44 are preferably provided as at 43 and 45. Such forward portion 30 of the frame structure 14 is adapted to be shifted upwardly or downwardly while maintaining the same general orientation thereof, by virtue of the parallel configuration of the elements by which it is shiftably mounted upon the rearward portion of the frame 14 attached to the tractor 12. More specifically, the rear member 32 of the forward frame assembly 30 is pivotally connected as at 46 and 48 to rearwardly extending, swingable side members 50 and 52, the rear extremities of the latter being pivotally mounted upon the cross member 18 extending across the front of the tractor 12, which provides the lower portion of the parallel motion mounting, while the upper portion of the latter is provided by a central member 54 pivoted to the forward post 44 as at 56 and having a rearward bifurcated portion 58 pivoted to the rearward post 22 as at 60. In my currently preferred construction, the side members 50 and 52 are secured by welding or the like to the opposite ends of a pivot tube 62 rotatably received within spaced sleeves 64 and 66 secured to the cross member 18.

In order to provide for controllably shifting the members 50 and 52 to raise and lower the forward frame assembly 30 to a desired height, a hydraulic piston and cylinder assembly 68 extends between pivotal connections as at 70 and 72 respectively upon a bracket 74 near the top of the post 22 and a crank arm 76 extending forwardly from and secured to the pivot tube 62. By conventional hydraulic controls (not shown) associated with the piston and cylinder assembly 68 and disposed adjacent the operator's station of the tractor 12, the operator may selectively vary the elevational positioning of the members 50 and 52 and the element 58 to raise and lower the forward frame assembly 30 to various heights without altering the level orientation of the latter. Since the applicators hereinafter described for each of the agricultural chemicals to be applied are carried by support structures in turn carried by the forward, shiftable portion 30 of the tractor-mounted frame 14, this permits such applicators to be controllably positioned at whatever heights may be optimal to meet given field conditions, such as just above the level of a growing soybean crop in order to apply minimal-contact-kill herbicide to volunteer corn and weeds growing above the tops of the soybean crop, and if desired, simultaneously applying a spray-type second chemical (such as an insecticide) to the soybean crop itself.

The direct-engagement type applicator is preferably constructed in sections including a "lazy-U" shaped central section broadly designated 80 and a pair of similarly configured side sections 82 and 84, the details of which will be further described hereinafter. For the moment, however, it is noted that the relatively shorter, central section 80 may be supported directly from the frontal member 34 of the front frame assembly 30 by suitable clamping means such as a bracket 85 bolt-clamped to the member 34 and a pair of over-size "hose" type clamps 86 and 87 respectively embracing upper and lower stretches 89 and 91 of the applicator section 80 and suitably secured to the bracket 85 (See FIG. 6). The side sections 82 and 84 of the direct-engagement type applicator are, however, shiftably supported by similar, but oppositely extending, lateral support structures 88 and 90. Referring to the support structure 90 for illustration of the preferred construction for both it and the support structure 88, it will be seen from FIG. 4 that the same includes a laterally extending front member 92 pivoted as at 93 to the side member 38 of the forward frame assembly 30, a rearwardly extending base member 94, and a rearward hypotenuse member 96 also pivoted to the side member 38 of the forward frame assembly 30 as at 98. As best seen in FIG. 1, there is also an upstanding post 100 upon the inner, front-to-rear extending member 94 and an inclined, laterally extending bracing element 102 pivotally connected as at 104 with a bracket 106 on the front member 92 and pivotally connected at its opposite end by a removable pin 108 with the upper end of the post 100. The support structure 90 is adjusted to and held in any desired angular elevational position thereof relative to its pivotal mounting on the frame assembly 30 at 93 and 98 by means of a hydraulic piston and cylinder assembly 110 oppositely connected with the post 100 as at pivot point 112 and with a bracket 114 on the forward frame assembly 30 as at pivot point 116. Again, it should be understood that the operator may manipulate hydraulic controls (not shown) for operating the piston and cylinder assembly 110 to adjust the inclination of the support structure 90 to any angle appropriate for accommodating to laterally sloping terrain conditions or the like. An identical arrangement, including a piston and cylinder assembly 118, is provided for similarly controlling the inclination of the opposite but similarly constructed support structure 88 with respect to horizontal. It will be understood that the direct engagement applicator sections 82 and 84 are mounted on the front member 92 of the support structures 88 and 90 in a manner similar to that previously described for the mounting of the applicator section 80 upon the front member 34.

The relative disposition of parts illustrated in FIGS. 1, 2 and 4 may be considered typical for employment of the apparatus 10 in the field to apply agricultural chemicals, although the height of the frame structure assembly 30 and the support structures 88 and 90, as well as the inclination of the latter, are controllably adjustable by the operator without leaving his operating position on the tractor 12 as previously described. The nature of the applicator portions of the apparatus 10 will be discussed in greater detail hereinafter.

However, reference may next appropriately be made to FIG. 3, in which the apparatus 10 is shown in a between-use condition to which it may be folded for traveling through gates, along roads or the like. The provision of some means to permit such folding of agricultural implements having normally laterally extending portions is, of course, a broadly conventional technique in the manufacture of such equipment. Nevertheless, the structural arrangement utilized for that purpose in the apparatus 10 is believed to be particularly adapted for minimizing the required components and simplifying the operator procedures which are required to convert the specific apparatus 10 between its traveling and its normal operating conditions. Essentially all that is required to arrange the apparatus 10 in its traveling condition is to remove the pins 108 that interconnect the bracing elements 102 with the posts 100 during normal usage and to retract the piston and cylinder assemblies 110 and 118 to raise the support structures 88 and 90 to the position shown in FIG. 3, whereupon the pins 108 may be reinserted to secure the distal ends of the bracing elements 102 to a bracket 120 provided for that purpose upon the inclined bracing member 42 of the forward frame assembly 30. In that condition, the support structures 88 and 90 are raised to substantially vertically extending positions even inside the width defined by the wheels 122 and 124 of the tractor 12 to facilitate transportation of the apparatus 10 virtually anywhere that the tractor 12 might otherwise be able to go. To restore the apparatus 10 to its operative condition, the procedure is simply reversed, with the pins 108 being removed to free the inner ends of the bracing elements 102, the piston and cylinder assemblies 110 and 118 are expanded to lower the support structures 88 and 90 to desired levels, and the pins 108 are utilized to resecure the inner ends of the bracing elements 102 to the posts 100.

Referring to FIG. 4, the spray type applicator 126 provided in the apparatus 10 will be seen to include a plurality of liquid spray heads 128 of any suitable type spaced along and mounted upon the rearward, hypotenuse member 96 of each of the support structures 88 and 90. If desired, one or more such spray heads as at 130 may also be provided on the rearward member 32 of the assembly 30. The spray heads 128 and 130 are fed with any selected liquid agricultural chemical from the reservoir 28 under suitable pressure for proper spraying action of the heads 128 and 130, via a pump 132 driven by a motor 134 and a liquid conduit 136 (of which at least portions 137 and 138 are flexible to accommodate to shifting of the support structures 88 and 90) coupled with the heads 128 and 130. The motor 134 may typically be driven hydraulically from the tractor 12, in which case it is convenient to mount the pump 132 and motor 134 in any suitable fashion upon the intermediate portion 50, 52 of the frame structure 14 (as indicated generally at 140 in FIG. 2), although they might also be mounted on a more rearward portion of the frame structure 14 adjacent the reservoir 28 if that was desired, it being understood that the conduit 136 should in any case include appropriate flexible stretches to accommodate to relative shifting between portions of the apparatus 10.

Reference is next made particularly to Figs. 5, 6, 7 and 9, wherein my preferred construction for the contact type applicator sections 80, 82 and 84 and the means for supplying a recirculated, contact-action type, liquid agricultural chemical thereto are shown in greater detail. It is first noted that, aside from the side sections 82 and 84 typically being longer than the central section 80 and the orientation of the "lazy-U" configuration of one of the side sections, say 84, being opposite that of the central section 80 and the other side section, say 82, the construction of each of the sections 80, 82 and 84 is substantially identical.

The "lazy-U" configuration and disposition of the sections 80, 82 and 84, although not essential, is desirable to provide upper and lower stretches 89 and 91 each contactable by weeds or the like being treated, as the apparatus 10 moves through a field. The lower stretch 91 is preferably mounted somewhat rearwardly of the upper stretch 89 and, besides contacting the shorter weeds or the like being treated, will also tend to provide a second chemical applying contact with taller, tougher weeds or the like initially contacted by the stretch 89 as they commence to pass under the apparatus 10. Such construction of the sections 80, 82 and 84 also facilitates making the liquid connections with the outer sections 82 and 84 required for recirculation of the liquid chemical material through each of the latter at locations adjacent the inner ends of the support structures 88 and 90, where their shiftability relative to the frame assembly 30 is least.

As best shown in FIGS. 5 and 6, each applicator section 80, 82 or 84 includes a generally U-shaped, elongate, hollow, relatively rigid, conduit member 140, which may be formed with conventional PVC plastic pipe and fittings having an upper leg 142, a bight 144, a lower leg 146, caps 148 and 150 on the distal ends of the legs 142 and 146 respectively, an inlet port fitting 152 adjacent the distal end of the upper leg 142, and an outlet port fitting 154 adjacent the distal end of the lower leg 146. The legs 142 and 146 are each provided with orifices 156 at spaced intervals therealong. Typical sizings for the members 140 would be a bight to distal ends length of about 8 feet for the outer sections 82 and 84 and about 4 feet for the central section 80, a spacing between the legs 142 and 146 of about 7 inches, a diameter of about ⅜ inch for the legs 142 and 146 and the bight 144, a hole diameter for the orifices 156 of about 1/16 inch, and a spacing between the holes 156 of about 6 inches.

Mounted upon and in covering relationship to member 140, or at least the orificed leg portions 142 and 146 thereof, is a generally cylindrical, porous "wettable", sleeve assembly 160 including an inner, liquid absorbing portion 162 and a preferably removable, outer foraminous portion 164. The inner absorbent, sleeve portion 162, which may typically be about 2½ inches in diameter, is formed of a material that will store liquids within its interstices, my present preference being for a cellulose material of the type manufactured for use in household "sponges", such as the one marketed by General Mills, Inc. of Tonawanda, N.Y., under the trademark "OCELO". Such materials can be either used in a tubular configuration fitted over the member 140 or can be formed into the required absorbent mass by wrapping the same in strip form upon the member 140. The outer, foraminous, sleeve portion 164 is in the nature of a woven jacket preferably formed of abrasion resistant material, such as canvas or heavy nylon cloth, sized to snugly fit over the inner sleeve portion 162 and preferably provided with releasable fastening means 170 along a longitudinal split therein to facilitate removal and reinstallation after periodic cleaning or when replacement may be needed due to continued abrasive engagement with field weeds or the like; as indicated in FIG. 7, my preferred construction employs a zipper mechanism for the fastening means 170.

Referring next to FIG. 9, my preferred arrangement for recirculating a contact-acting type agricultural chemical through the conduit members 140 of the applicator sections 80, 82 and 84 is schematically depicted. Such chemical is drawn from the reservoir 29 therefor by a pump 180 driven at a control led speed by a motor 182 and fed under a small positive pressure from the pump 180 to the conduit member 140 of each of the applicator sections 80, 82 and 84 through a common conduit means 184, thence through parallel, branch conduit paths 186, 188 and 190 to the inlet ports 152 of the respective conduit members 140. A return path for the recirculation of such chemical from the conduit members 140 of each of the applicator sections 80, 82 and 84 is traceable from the outlet ports 154 of the latter through converging branch conduit paths as at 192, 194, etc. to a common conduit 196 feeding back into the reservoir 29. It will be noted that a normally open valve 198 is interposed in series with the return conduit 196 for purposes hereinafter noted.

The pump 180 and motor 182 may be conveniently mounted either upon the intermediate portion of the frame structure as generally indicated at 440 in FIG. 2 or at a more rearward location on the frame 14 adjacent the reservoir 29. As with the motor 134, the motor 182 may be either of the hydraulic or electric type, but it is particularly important that suitable controls be provided to permit the operator to adjust the speed of the motor 182, and thereby the pump 180, to maintain the recirculation of the chemical through the sections 80, 82 and 84, while at the same time maintaining the pressure of such liquid chemical at a relatively low positive level sufficient to feed an amount of such chemical through the orifices 156 in the top surfaces of the legs 142 and 146 of the conduit members 144 at a rate that will maintain the sleeves 160 adequately saturated or "wetted" with the chemical material for effective contact-action application to undesired plant growth engaging the same, while not feeding such chemical to the sleeves 160 at a rate that would cause drippage. It is believed that the recirculation of the liquid chemical through the conduit members 140, in cooperation with the liquid holding characteristics of the absorbent inner sleeve portions 162 tends to maintain the saturation of the inner sleeve portions 162 more or less uniform throughout their masses by essentially withdrawing liquid from over-saturated portions of the inner sleeve 162 through the adjacent orifices 156, while supplying other localized portions of the inner sleeve 162 with additional liquid through the orifices 156 proximate thereto to replace liquid that has been removed from parts of the sections 80, 82 and 84 that have been in greatest contact with the undesired plant growth being treated. Thus, with adjustment of the speed of the pump 180 appropriate for the constructional parameters of a particular installation, such as the internal volume of the members 140, the diameters of the orifices 156, the size and absorbent characteristics of the sleeves 160 and the pumping characteristics at given speeds of the pump 180 itself, a proper equilibrium in which the sleeves 160 are adequately and more or less evenly saturated without drippage therefrom can be maintained.

The normally open manual valve 198 is provided merely for use during the initial making ready of the apparatus 10 for field usage; at such time, the valve 198 may be temporarily adjusted to impede the return path through the conduit 196 to the reservoir 29, which will permit the pump 180 to more quickly accomplish an initial saturation of the sleeves 160 prior to taking the apparatus 10 into the crop area where a treatment to undesired plant growth is to be administered. Before actually commencing the application operation in a crop area, the operator should reopen the valve 198 and make any adjustment that might be required in the speed of the motor 180 to maintain the mentioned equilibrium of saturation of the sleeves 160 without drippage therefrom.

It will be observed that the provision in the apparatus 10 of separate and individually controllable systems for supplying the contact-action type chemical from the reservoir 29 to the applicators 80, 82 and 84 and for supplying a spray-type chemical substance from the reservoir 28 to the spray heads 128 permits the apparatus to perform either type of application or, most significantly, to perform both of such applications simultaneously during a single pass through the crop area to be treated. Moreover, the mounting of both the contact-action applicators 80, 82 and 84 and the spray heads 128 upon the same shiftable support structures as at 88 and 90, also permits adjustments of the latter for height or angularity to accommodate given terrain and to maintain both types of applicators in properly adjusted positions relative to the plants being treated and the terrain for reliable and effective operation.

It will be recognized by those skilled in the art that a number of minor modifications in constructional details might be made without departing from the spirit and essence of the invention. Accordingly, it is to be understood that the invention should be deemed limited only by the fair scope of the claims which follow, including mechanical equivalents of the subject matter which they cover.

I claim:

1. In apparatus for applying an agricultural chemical in liquid form to selected plants extending above the tops of a field crop:

reservoir means adapted for receiving a quantity of said chemical and having inlet means and outlet means;

an elongate, substantially rigid and non-deformable, tubular conduit member having inlet means and outlet means respectively adjacent opposite extremities thereof and having at least one substantially straight, substantially horizontal, elongate stretch provided with a plurality greater than two of restricted but continuously open orifice means in a top portion only thereof and disposed at substantially regularly spaced longitudinal intervals therealong;

elongate, substantially cylindrical, porous, liquid absorbent, sleeve means mounted on each said stretch in circumscribing relationship to the latter and in liquid communicating relationship with each of said orifice means of said stretch for restricted flow of said chemical from said member to said sleeve means on said stretch at a plurality greater than two of points spaced along said top portion of the latter;

first coupling means for providing a first liquid communication path from said outlet means of said reservoir means to said inlet means of said member;

second coupling means for providing a second liquid communication path from said outlet means of said member to said inlet means of said reservoir means;

liquid pump means interposed in series with said first path and having inlet means in liquid communication with said outlet means of said reservoir means and outlet means in liquid communication with said inlet means of said member;

drive means operably coupled with said pump means for operating the latter, said drive means being activated for continuously recirculating said chemical through said pump means, said conduit member, said second path, said reservoir means and said first path and for maintaining said chemical under a selected pressure in said one stretch of said conduit means during normal operation of said apparatus for application of said chemical to said selected plants; and supporting means adapted for mounting said reservoir means, said member and said sleeve means associated therewith, said first and second coupling means, said pump means and said drive means on a mobile vehicle with said one stretch of said conduit member and said sleeve means thereon extending generally transversely to a normal direction of travel of said vehicle, said mounting means being adjustable for positioning said one stretch of said member and said sleeve means on the latter at a height for brushing engagement of said selected plants with said sleeve means on said one stretch when said vehicle is moved in said direction of travel thereof across a field where said selected plants are situated.

* * * * *